United States Patent
Bento et al.

(10) Patent No.: US 12,504,266 B2
(45) Date of Patent: Dec. 23, 2025

(54) FLATNESS TESTING FOR CATHODES

(71) Applicant: Raytheon Company, Arlington, VA (US)

(72) Inventors: Joaquim A. Bento, Marlborough, MA (US); Mark J. Beaulieu, Sutton, MA (US)

(73) Assignee: Raytheon Company, Arlington, VA (US)

( * ) Notice: Subject to any disclaimer, the term of this patent is extended or adjusted under 35 U.S.C. 154(b) by 277 days.

(21) Appl. No.: 18/214,863

(22) Filed: Jun. 27, 2023

(65) Prior Publication Data
US 2025/0003725 A1  Jan. 2, 2025

(51) Int. Cl.
*G01B 5/28* (2006.01)

(52) U.S. Cl.
CPC ................... *G01B 5/28* (2013.01)

(58) Field of Classification Search
CPC ........................................ G01B 5/28
USPC ......................................... 33/533
See application file for complete search history.

(56) References Cited

U.S. PATENT DOCUMENTS

| | | | | |
|---|---|---|---|---|
| 2,496,212 A | * | 1/1950 | Holt | G01B 5/204 |
| | | | | 33/555.1 |
| 3,479,744 A | * | 11/1969 | Wiesner | G01B 5/213 |
| | | | | 33/501.2 |
| 4,491,787 A | | 1/1985 | Akiyama et al. | |
| 4,903,413 A | * | 2/1990 | Bellwood | G01B 7/282 |
| | | | | 33/555.1 |
| 5,014,440 A | * | 5/1991 | Lessi | G01B 7/16 |
| | | | | 33/783 |
| 5,617,643 A | | 4/1997 | Kato et al. | |
| 6,604,295 B2 | * | 8/2003 | Nishimura | G01Q 10/045 |
| | | | | 850/37 |
| 6,874,243 B2 | * | 4/2005 | Hama | G01B 5/28 |
| | | | | 33/551 |
| 7,109,483 B2 | | 9/2006 | Nakasuji et al. | |
| 7,197,836 B2 | * | 4/2007 | Kikuti | G01B 21/042 |
| | | | | 33/503 |
| 7,228,640 B2 | * | 6/2007 | Trionfetti | B24B 49/04 |
| | | | | 33/555.1 |
| 7,797,851 B2 | * | 9/2010 | Funabashi | G01B 7/012 |
| | | | | 33/561 |
| 7,950,164 B2 | * | 5/2011 | Nakayama | G01B 5/28 |
| | | | | 33/559 |

(Continued)

FOREIGN PATENT DOCUMENTS

| | | |
|---|---|---|
| CN | 212585647 U | 2/2021 |
| JP | 2010-174268 A | 8/2010 |
| WO | 2020/215703 A1 | 10/2020 |

*Primary Examiner* — George B Bennett
(74) *Attorney, Agent, or Firm* — Schwegman Lundberg & Woessner, P.A.

(57) ABSTRACT

An apparatus for testing flatness includes a main fixture defining a longitudinal axis along a direction between a base of the main fixture and a testing end of the main fixture. A gimbal is slidingly engaged to the main fixture to slide in a direction along the longitudinal axis. A biasing member is axially between the base and the gimbal. Three rotating arms are mounted to the testing end of the main fixture. The rotating arms and gimbal are configured to affix a test article in the testing end of the main fixture flat with respect to the three rotating arms to establish a datum plane for flatness testing of the test article.

15 Claims, 6 Drawing Sheets

(56) References Cited

U.S. PATENT DOCUMENTS

| | | | | |
|---|---|---|---|---|
| 8,504,316 B2* | 8/2013 | Tamai | ............... | G01B 21/042 |
| | | | | 702/94 |
| 8,959,986 B2* | 2/2015 | Mies | ............... | G01B 5/28 |
| | | | | 73/105 |
| 9,285,201 B2* | 3/2016 | Matsumiya | ............... | G01B 7/28 |
| 9,869,538 B2* | 1/2018 | Dolgikh | ............... | G01B 5/008 |
| 9,933,248 B2* | 4/2018 | Mariller | ............... | G01B 5/004 |
| 9,933,277 B2* | 4/2018 | Terauchi | ............... | G01B 5/28 |
| 11,859,969 B2* | 1/2024 | Morii | ............... | G01B 3/004 |
| 2008/0021672 A1* | 1/2008 | Powley | ............... | G01B 5/008 |
| | | | | 702/158 |
| 2024/0142214 A1* | 5/2024 | Makino | ............... | G01B 5/28 |

* cited by examiner

FLATNESS TESTING FOR CATHODES

BACKGROUND

1. Field

The present disclosure relates to flatness testing for manufactured surfaces, and more particularly to testing flatness for cathodes in triodes for radio transmitters and the like.

2. Description of Related Art

Cathodes within triodes have a relatively low production yield during manufacturing. The cathode flatness is needed to ensure the special coating thickness on a dish of triodes is effective for flow of electrons in vacuum tube transmitters.

For certain transmitters, two key dimensional requirements need to be met for production: thickness of a cavity in the cathode before coating, and the thickness between the top of the cavity and the top of a circumferential housing the cathode. These two dimensions must be correct just prior to applying the cathode spray. After applying the coating, the coating is leveled to match the height of the circumferential height, so thickness is determined by the height of the cathode dish relative to the circumferential top surface. Traditional techniques for ensuring these dimensions use an indirect methods of measurement and are deemed questionable in accuracy and repeatability. This contributes to the low production yields.

The conventional techniques have been considered satisfactory for their intended purpose. However, there is an ever present need for improved systems and methods for testing dimensions in cathodes such as used in triodes for radio transmitters and the like. This disclosure provides a solution for this need.

SUMMARY

An apparatus for testing flatness includes a main fixture defining a longitudinal axis along a direction between a base of the main fixture and a testing end of the main fixture. A gimbal is slidingly engaged to the main fixture to slide in a direction along the longitudinal axis. A biasing member is axially between the base and the gimbal. Three rotating arms are mounted to the testing end of the main fixture. The rotating arms and gimbal are configured to affix a test article in the testing end of the main fixture flat with respect to the three rotating arms to establish a datum plane for flatness testing of the test article.

The test article can be a cathode for a triode. The test article can include an annular circumferential body with a top surface defining the datum plane with the three rotating arms, and a cathode body. The base can include a threaded element that engages with threads in a bore of the main fixture that houses the biasing member.

The three rotating arms can be circumferentially equidistant from one another relative to the longitudinal axis. A collar can be included around the testing end of the main fixture, configured to slide relative to the main fixture between a first position for receiving the test article into the testing end of the main fixture, and second position for securing the test article in the testing end of the main fixture axially between the three rotating arms and the gimbal. The collar can be configured to rotate the three rotating arms into contact with the test article as the collar transitions from the first position to the second position. Three set screws can be included, one set screw for each of the three rotating arms. Each of the three set screws can be threaded into the collar and is configured to tighten against a respective one of the three rotating arms to lock the respective one of the rotating arms in place against the test article.

The gimbal can include a cylinder engaged to the biasing member, a tooling ball extending axially from the cylinder with a ball surface extending axially away from the cylinder, and a test article holder engaged to the ball surface, extending axially away from the cylinder and configured to receive the test article and press the test article axially against the three rotating arms. A spring plunger can be included extending radially through the main fixture into contact with the cylinder to lock the cylinder in place within the main fixture. A handle can be included extending radially through the main fixture through an oversized bore into contact with the cylinder to allow manipulation of the cylinder within the main fixture.

A granite base can include a vice engaged to the base of the main fixture. A visual indicator on the main fixture can be configured for visual alignment of the main fixture with the vice of the granite base. A micrometer can be affixed to the granite base. The micrometer can include a probe configured to contact the test article in the testing end of the main fixture for determination of flatness of a surface of the test article. The micrometer can be analog or digital.

A method of testing flatness includes placing a test article on a gimbal that is slidingly engaged to a main fixture. The method includes rotating three rotating arms into contact with a datum surface of the test article axially opposite from the gimbal across the test article, and making multiple micrometer measurements of a test surface of the test article relative to the datum surface to determine whether flatness of the test surface is within one or more tolerable specifications or not. The method can include spraying a coating onto the test surface of the test article and repeating the placing, rotating, and making multiple micrometer measurements on the test article after the spraying.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a partial view of an embodiment of an apparatus in accordance with the disclosure is shown in FIG. 2 and is designated generally by reference character 100. Other embodiments of systems in accordance with the disclosure, or aspects thereof, are provided in FIGS. 1 and 3-6, as will be described. The systems and methods described herein can be used to test flatness of cathodes for radio transmitter triodes during production to reduce losses in production yields relative to more traditional techniques.

Figure 1:
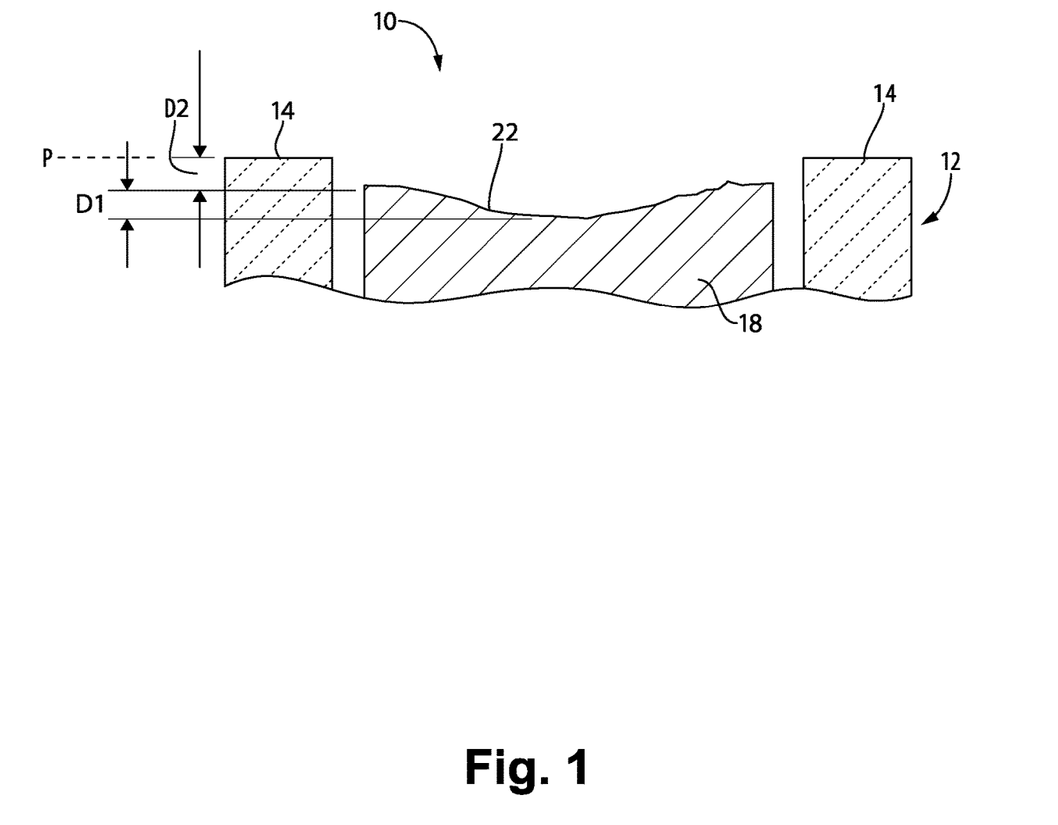
FIG. 1 is a cross-sectional side elevation view of an embodiment of a test article constructed in accordance with the present disclosure, showing two dimensions that are controlled for flatness tolerancing.
Figure 2:
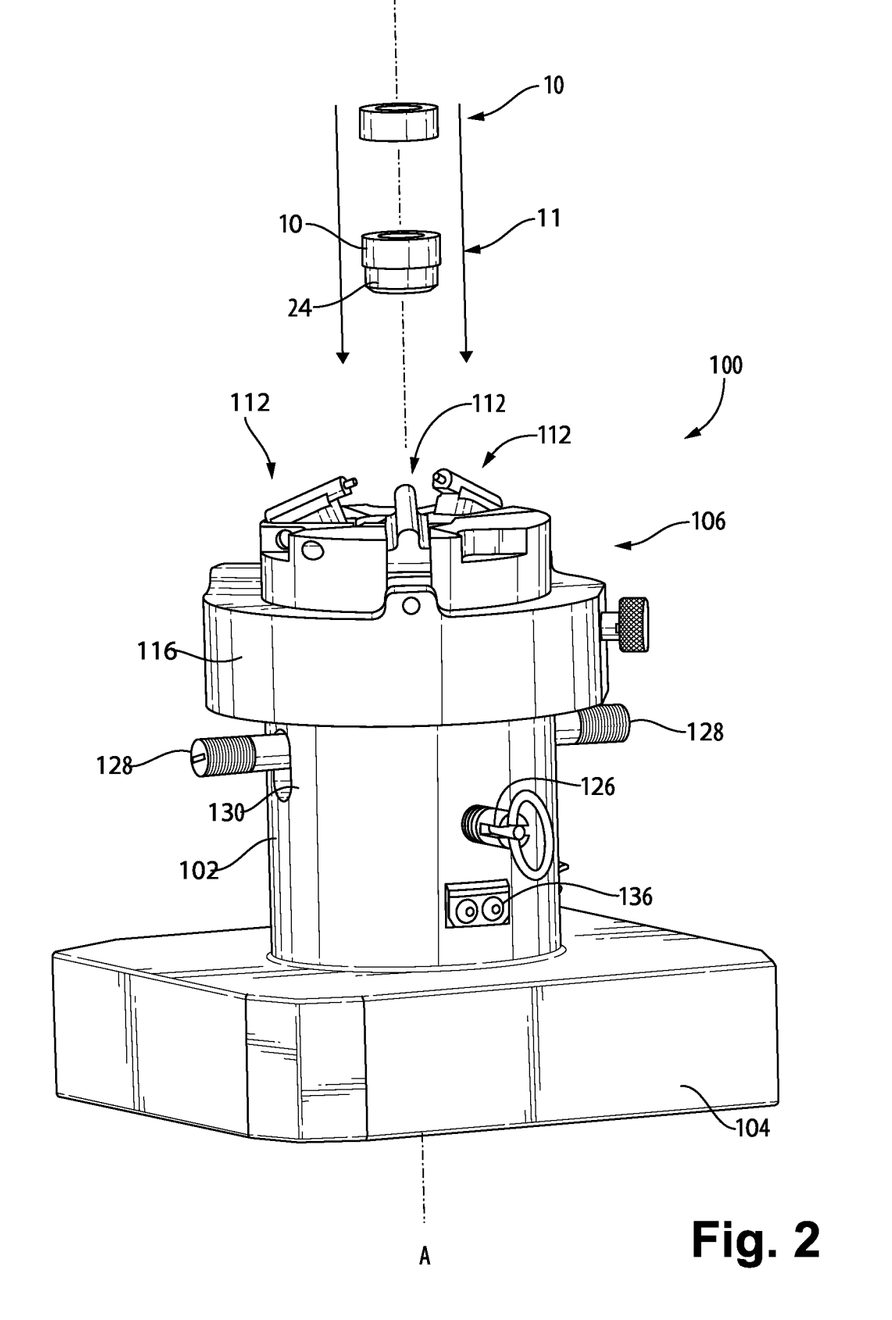
FIG. 2 is a schematic perspective view of an apparatus for testing flatness constructed in accordance with the present disclosure, showing two test articles that can be tested for flatness in the apparatus.

With reference to FIG. 1, the test article 10 includes an annular body 12 with a top surface 14 defining the datum plane P. A cathode body 18 is affixed to the body 12. The cathode body 18 has a cavity on its top surface, as oriented in FIG. 1. There are two dimensions that need to be within specification for manufacturing the triode. First is the dimension D1, which is the depth of a cup 22 defined on the top surface of the cathode body 18 (as oriented in FIG. 2). The second is the dimension D2, the thickness of the coating from the upper most extent of the cathode body 18 (as oriented in FIG. 2) up to the datum plane P defined by the upper surface 14 of the annular body 12.

With reference now to FIG. 2, an apparatus 100 is disclosed for testing the flatness of the test article 10 (as oriented in FIG. 1) based on the dimensions D1 and D2. The apparatus 100 includes a main fixture 102 defining a longitudinal axis A along a direction between a base 104 of the main fixture 102 and a testing end 106 of the main fixture 102.

Figure 3:
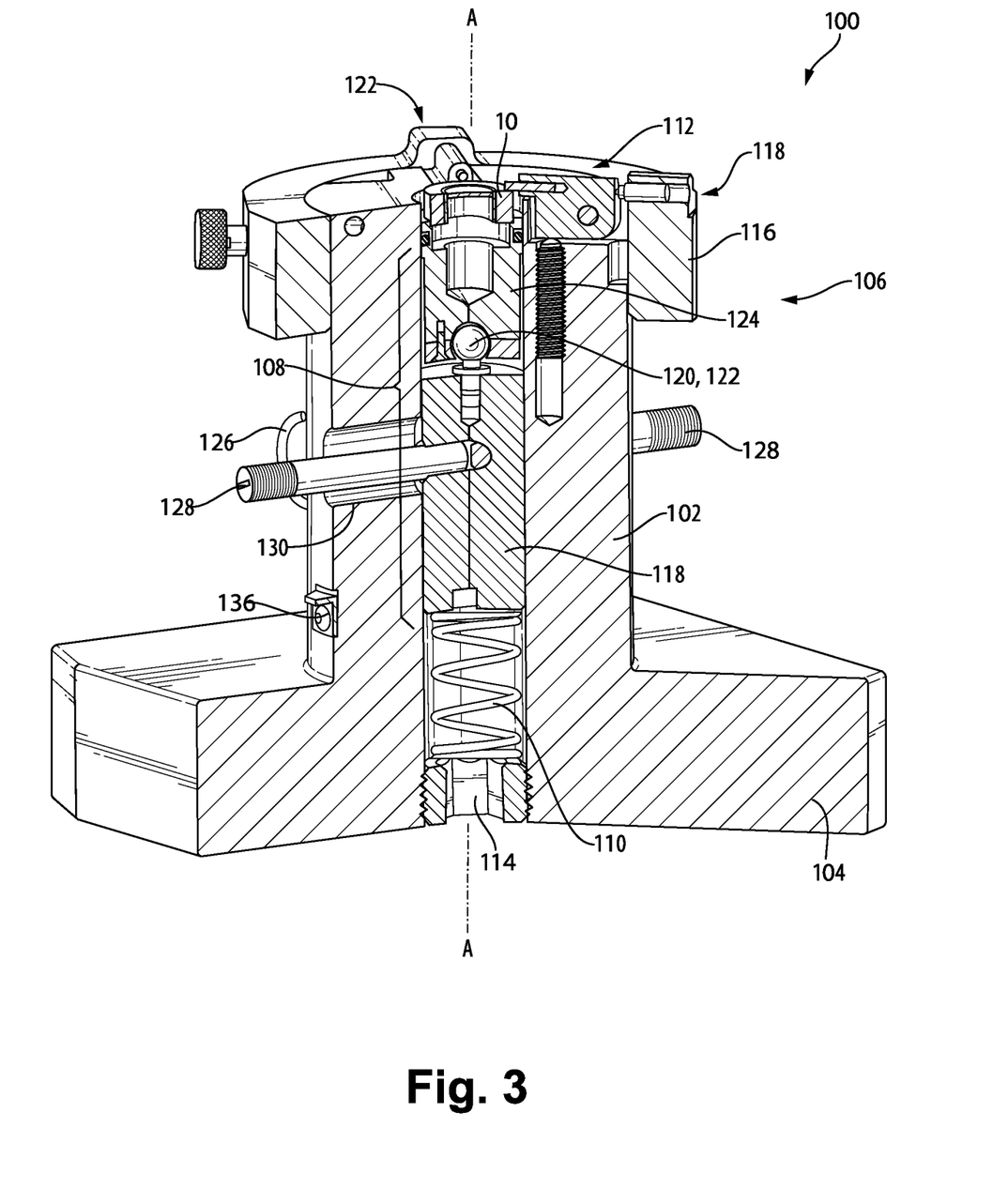
FIG. 3 is a schematic cross-sectional perspective view of the apparatus of FIG. 2, showing the gimbal.

With reference now to FIG. 3, a gimbal 108 is slidingly engaged to an interior bore of the main fixture 102 to slide in a direction along the longitudinal axis A. A biasing member 110, such as a spring, Belleville washer, or other resilient member, is axially between the base 104 and the gimbal 108. The base 104 includes a threaded element 114 that engages with threads in the bore of the main fixture 102 that houses the biasing member 110, wherein twisting the threaded member 114 in the bore allows for adjustment of tensioning of the biasing member 110. Three rotating arms 112 (one of which is cut away in FIG. 3, but see FIG. 2) are mounted to the testing end 106 of the main fixture 102. The three rotating arms 112 are circumferentially equidistant from one another relative to the longitudinal axis A. The rotating arms 112 and gimbal 108 are configured to affix a test article 10 axially therebetween in the testing end 106 of the main fixture 102, flat with respect to the three rotating arms 112 to establish the datum plane P (labeled in FIG. 1) for flatness testing of the test article 10.

Figure 4:
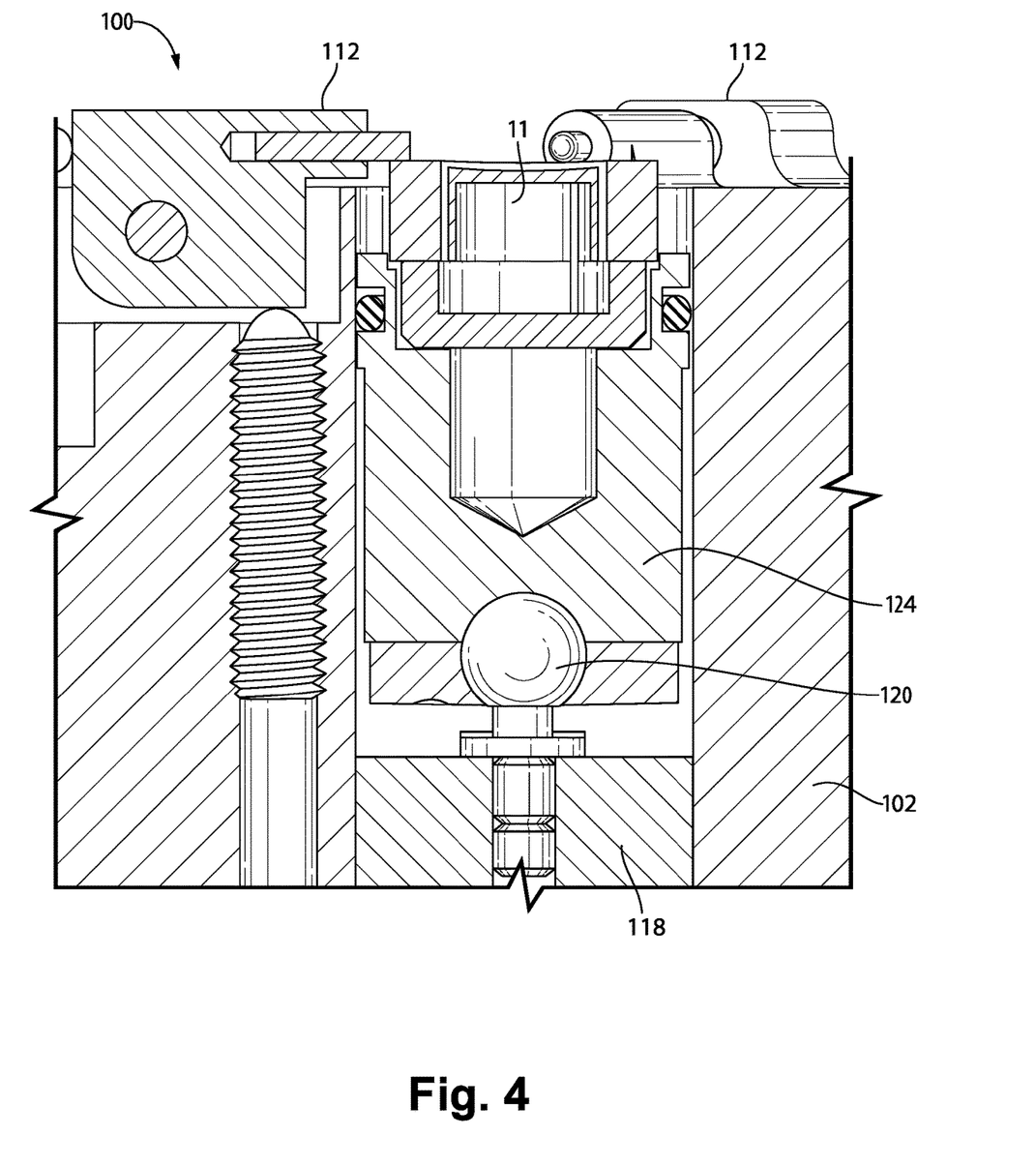
FIG. 4 is a cross-sectional side-elevation view of the apparatus of FIG. 2, showing a test article seated in the testing end of the main fixture.

With continued reference to FIG. 3, a collar 116 is included around the testing end 106 of the main fixture 102. The collar 116 to slides along the direction of the axis A relative to the main fixture 102 back and forth between a first position (shown in FIG. 2) for receiving the test article 10 into the testing end 106 of the main fixture 102, and second position (shown in FIG. 3) for securing the test article 10 in the testing end 106 of the main fixture axially between the three rotating arms 112 and the gimbal 108. The collar 116 is configured to drive rotation of the three rotating arms 112 downward from their position in FIG. 2 into contact with the test article 10 as shown in FIG. 4 as the collar 116 transitions upward as oriented din FIG. 3 from the first position to the second position. Three set screws 118 are included, one set screw for each of the three rotating arms 112. Each of the three set screws 118 is threaded into the collar 116 and is configured to tighten against a respective one of the three rotating arms 112 to lock the respective one of the rotating arms 112 in place against the test article 10. Only one of the set screws 118 is visible in the cross-section of FIG. 3, however those skilled in art will readily appreciate that similar set screws 118 are arranged similarly for each of the other two arms 112.

With continued reference to FIG. 3, the gimbal 108 includes a cylinder 118 engaged to the biasing member 110. A tooling ball 120 extends axially upward from the cylinder 118 as oriented in FIG. 4, with a ball surface 122 extending axially away from the cylinder 118. The gimbal 108 also includes a test article holder 124 engaged to the ball surface, extending axially away from the cylinder 118. The upper end of the test article holder 124 as oriented in FIG. 4 includes a seat for receiving the test article 10, which presses the test article 10 axially against the three rotating arms 112. A retractable spring plunger 126 is included extending radially through the main fixture 102 into contact with the cylinder 118 to lock the cylinder 118 in place within the main fixture 102. A handle 128 is included extending radially through the main fixture 102 through an oversized bore 130 into contact with the cylinder 118 to allow manipulation of the cylinder 118 within the main fixture 102, i.e. for manually moving the cylinder 118 up and down along the axis A as oriented in FIG. 3.

Figure 5:
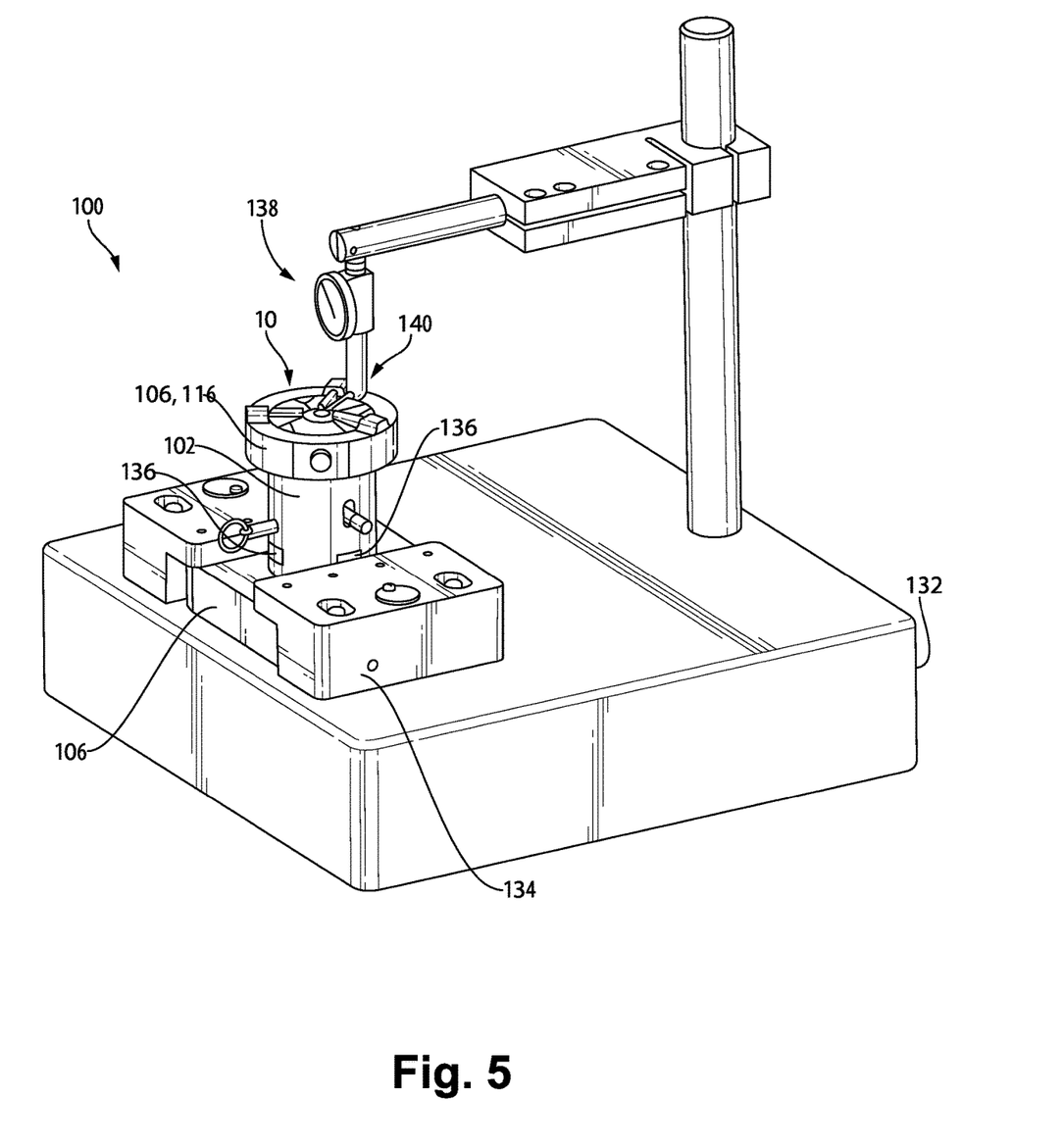
FIG. 5 is a schematic perspective view of the apparatus of FIG. 2, showing the main fixture on a granite base with an analog micrometer.
Figure 6:
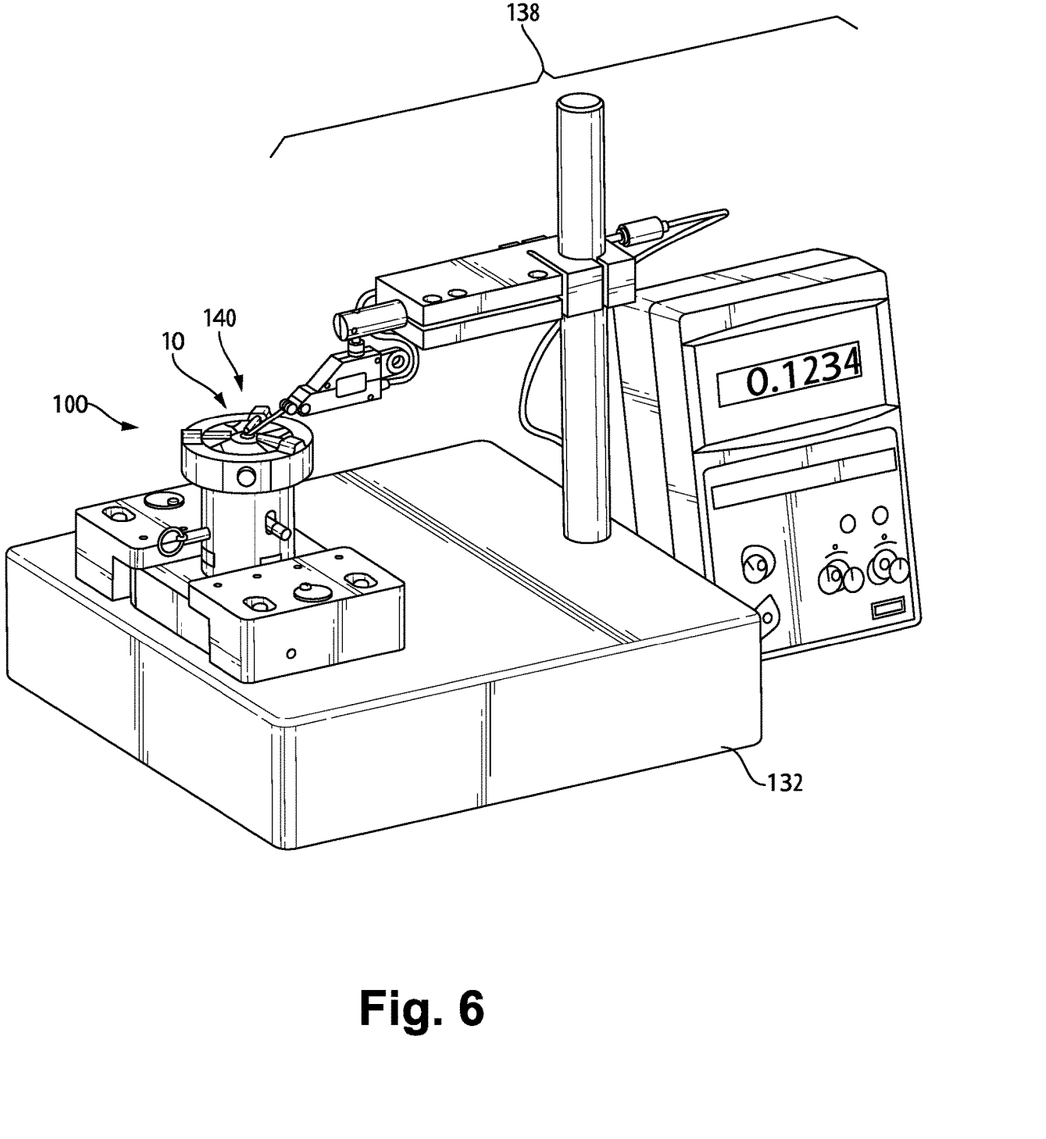
FIG. 6 is a schematic perspective view of the apparatus of FIG. 2, showing the main fixture on a granite base with a digital micrometer.

With reference now to FIG. 5, a granite base 132 includes a vice 134 engaged to the base 104 of the main fixture 102. Those skilled in the art will readily appreciate that any other suitable material beside granite can be used for the granite base 132, selected for reliable repeatability in measurements. Visual indicators 136 on the main fixture 102 are configured for visual alignment of the main fixture 102 with the vice 134 of the granite base 132. A micrometer 138 is affixed to the granite base 132. The micrometer includes a probe 140 configured to contact the test article 10 in the testing end 106 of the main fixture 102 for determination of flatness of a surface of the test article 10. The micrometer 138 can be analog as shown in FIG. 5, or digital as shown in FIG. 6.

With reference again to FIG. 2, a method of testing flatness includes placing a test article 10 on a gimbal 108 (labeled in FIG. 3) that is slidingly engaged to a main fixture 102. The method includes rotating three rotating arms 112 into contact with a datum surface P (labeled in FIGS. 1-2) of the test article 10 axially opposite from the gimbal 108 across the test article, as shown in FIG. 3, and making multiple micrometer measurements of a test surface of the test article 10 relative to the datum surface P to determine whether flatness of the test surface is within one or more tolerable specifications or not, as shown in FIGS. 5-6. The micrometer 138 can be zeroed out on the datum plane P by touching it to the upper surface 14 of the annular body 12, labeled in FIG. 1. Testing the test article 10 prior to the coating 20 allows for testing of the first dimension D1 as labeled in FIG. 1. After spraying the coating 20 onto the test surface 22 of the test article 10, and adding a package 24, the test can be repeated for this new test article 11. FIG. 2 shows the test article 10 prior to coating and also shows the test article 11 after coating and adding the package 24. FIG. 3 shows the test article 10 seated in the testing end 106 ready for testing, and FIG. 4 similarly shows the test article 11 ready for testing. If the test article 10, 11 passes the testing for D1 and the testing for D2 as described in the method above, the flatness of the cathode body 18 and its coating 20 can be considered correct for integrating into an assembly such as a radio transmitter.

Systems and methods as disclosed herein provide potential benefits over the more traditional techniques, including the following potential benefits. Systems and methods as disclosed herein use a simple plunger analog or digital indicator used to measure weld-in height and cathode spray flatness, and remove former issues with deforming under plunger forces during testing. Systems and methods here obviate "indirect" methods of measuring via use of a reference gauge or the like, and the operator is no longer required to apply hold-down forces to keep the cathode from springing out of place during testing. Systems and methods as disclosed herein eliminate the need for much larger probes traditionally used to touch the cathode surface introducing significant error.

The methods and systems of the present disclosure, as described above and shown in the drawings, provide for testing flatness of cathodes for radio transmitter triodes during production to reduce losses in production yields relative to more traditional techniques. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An apparatus for testing flatness comprising:
a main fixture defining a longitudinal axis along a direction between a base of the main fixture and a testing end of the main fixture;
a gimbal slidingly engaged to the main fixture to slide in a direction along the longitudinal axis;
a biasing member axially between the base and the gimbal; and
three rotating arms mounted to the testing end of the main fixture, wherein the rotating arms and gimbal are configured to affix a test article in the testing end of the main fixture flat with respect to the three rotating arms to establish a datum plane for flatness testing of the test article.

2. The apparatus as recited in claim 1, wherein the test article is a cathode for a triode, wherein the test article includes:
an annular circumferential body with a top surface defining the datum plane with the three rotating arms; and
a cathode body supported within the annular circumferential body.

3. The apparatus as recited in claim 1, wherein the base includes a threaded element that engages with threads in a bore of the main fixture that houses the biasing member.

4. The apparatus as recited in claim 3, wherein the three rotating arms are circumferentially equidistant from one another relative to the longitudinal axis.

5. The apparatus as recited in claim 4, further comprising a collar around the testing end of the main fixture, configured to slide relative to the main fixture between a first position for receiving the test article into the testing end of the main fixture, and a second position for securing the test article in the testing end of the main fixture axially between the three rotating arms and the gimbal, wherein the collar is configured to rotate the three rotating arms into contact with the test article as the collar transitions from the first position to the second position.

6. The apparatus as recited in claim 5, further comprising three set screws including one set screw for each of the three rotating arms, wherein each of the three set screws is threaded into the collar and is configured to tighten against a respective one of the three rotating arms to lock the respective one of the rotating arms in place against the test article.

7. The apparatus as recited in claim 1, wherein the gimbal includes:
a cylinder engaged to the biasing member;
a tooling ball extending axially from the cylinder with a ball surface extending axially away from the cylinder; and
a test article holder engaged to the ball surface, extending axially away from the cylinder and configured to receive the test article and press the test article axially against the three rotating arms.

8. The apparatus as recited in claim 7, further comprising a spring plunger extending radially through the main fixture into contact with the cylinder to lock the cylinder in place within the main fixture.

9. The apparatus as recited in claim 7, further comprising a handle extending radially through the main fixture through an oversized bore into contact with the cylinder to allow manipulation of the cylinder within the main fixture.

10. The apparatus as recited in claim 1, further comprising a granite base with a vice engaged to the base of the main fixture.

11. The apparatus as recited in claim 10, further comprising a visual indicator on the main fixture configured for visual alignment of the main fixture with the vice of the granite base.

12. The apparatus as recited in claim 10, further comprising a micrometer affixed to the granite base, wherein the micrometer includes a probe configured to contact the test article in the testing end of the main fixture for determination of flatness of a surface of the test article.

13. The apparatus as recited in claim 12, wherein the micrometer is analog or digital.

14. A method of testing flatness comprising:
placing a test article on a gimbal that is slidingly engaged to a main fixture;
rotating three rotating arms into contact with a datum surface of the test article axially opposite from the gimbal across the test article; and
making multiple micrometer measurements of a test surface of the test article relative to the datum surface to determine whether flatness of the test surface is within one or more tolerable specifications or not.

15. The method as recited in claim 14, further comprising spraying a coating onto the test surface of the test article and repeating the placing, rotating, and making multiple micrometer measurements on the test article after the spraying.

* * * * *